United States Patent [19]

Bonnerot et al.

[11] Patent Number: 5,088,110
[45] Date of Patent: Feb. 11, 1992

[54] BASEBAND-CONTROLLED PASSBAND EQUALIZING ARRANGEMENT

[75] Inventors: Georges Bonnerot, Les Ulis; Laurent Bourgeade, Vanves, both of France

[73] Assignee: Telecommunications Radioelectriques et Telephoniques T.R.T., Paris, France

[21] Appl. No.: 325,085

[22] Filed: Mar. 15, 1989

Related U.S. Application Data

[63] Continuation of Ser. No. 880,336, Jun. 24, 1986, abandoned, which is a continuation of Ser. No. 607,324, May 4, 1984, abandoned.

[30] Foreign Application Priority Data

May 11, 1983 [FR] France .................. 83 07909

[51] Int. Cl.$^5$ .............................................. H04B 3/04
[52] U.S. Cl. ............................................ 375/15; 375/14
[58] Field of Search .................... 375/11, 12, 14, 15, 375/39, 96; 333/18; 358/905

[56] References Cited

U.S. PATENT DOCUMENTS

| | | | |
|---|---|---|---|
| 3,775,688 | 11/1973 | Hinoshita et al. | 375/12 |
| 3,878,468 | 4/1975 | Falconer et al. | 375/15 |
| 3,992,616 | 11/1976 | Acker | 375/14 |
| 4,298,983 | 11/1981 | Kawai et al. | 375/12 |
| 4,315,318 | 2/1982 | White | 375/12 |
| 4,320,526 | 3/1982 | Gitlin | 375/14 |
| 4,361,892 | 11/1982 | Martin | 375/14 |
| 4,376,308 | 3/1983 | McNair | 375/14 |
| 4,524,422 | 6/1985 | Kasuga | 375/14 |

Primary Examiner—Benedict V. Safourek
Attorney, Agent, or Firm—Edward W. Goodman

[57] ABSTRACT

A baseband-controlled passband equalizing arrangement comprises a passband correction circuit for the data signals transmitted by modulating a carrier frequency, a first demodulation circuit which cooperates with a carrier recovery circuit for converting these carrier-modulated data signals into baseband signals, and a control circuit acting on the variable elements provided in the passband correction circuit in response to an estimated error of the baseband signals. The passband correction circuit produces a passband output signal v(t), which is a continuous function of the time t, in response to a passband input signal x(t), which is a continuous function of the time t, in accordance with the relation:

$$v(t) = \sum_{m=1}^{M} r_m e^{i\psi_m} v(t - \tau_m) + \sum_{j=0}^{N} \rho_j e^{i\phi_j} x(t - \tau_j)$$

where $r_m$, $\psi_m$, $\rho_j$, $\phi_j$ are variable elements, and $\tau_j$, $\tau_m$ are fixed delays and M, N are constants.

7 Claims, 6 Drawing Sheets

BASEBAND-CONTROLLED PASSBAND EQUALIZING ARRANGEMENT

This is a continuation of application Ser. No. 880,336, filed June 24, 1986, now abandoned, which was a continuation of application Ser. No. 607,324, filed May 4, 1984, and now abandoned.

The invention relates to a baseband-controlled passband equalizing circuit comprising a passband correction circuit for data signals transmitted by modulating a carrier frequency. A first demodulation circuit cooperates with a carrier recovery circuit, for converting these carrier-modulated data signals into baseband signals. A a control circuit acts on variable elements provided in the correction circuit in response to an estimated error in the baseband signals.

This type of circuit has important fields of application, for example receivers in high-speed digital transmission systems which employ transmission by radio links. To obtain these high speeds, two quadrature components of a carrier frequency are phase-modulated and amplitude-modulated (particularly in the case of 16 QAM modulation). On account of the structure of the receivers, the data signal to be processed is an intermediate-frequency signal, and the carrier frequency to be considered is this intermediate frequency.

Such a system is described in U.S. Pat. No. 3,878,468. In this known system it is necessary, for the correction of the data signal, first to form two paths: an in-phase path and a quadrature path. The signals in these paths are then sampled before they are applied to equalizer circuits provided for each of these paths. The prior art technique is very complicated because of the presence of equalizer circuits for each of the paths, and has the disadvantage that sampling is effected on the pass-band (carrier frequency) signal. In fact, an error at the sampling instant may disturb the proper operation of the control circuit.

SUMMARY OF THE INVENTION

It is an object of the present invention to obviate the main disadvantage of this prior art circuit by rendering sampling superfluous.

In accordance with the invention an circuit of the type set forth includes a passband correction circuit which produces a passband output signal v(t), which is a continuous function of the time t, in response to a passband input signal x(t). This continuous function of time t is in accordance with the expression:

$$v(t) = \sum_{m=1}^{M} r_m e^{i\psi_m} v(t - \tau_m) + \sum_{j=0}^{N} \rho_j e^{i\phi_j} x(t - \tau_j)$$

where $r_m$, $\psi_m$, $\rho_j$, $\phi_j$ are variable elements, and $\tau_j$, $\tau_m$ are fixed delays and M, N are constants.

In a preferred embodiment, the equalizing circuit is further provided with an amplifier upstream of the first demodulation circuit having a gain control connected to a gain control circuit for keeping the proportion of signals having at least one coordinate higher than the maximal nominal value at a level which is, on an average, constant.

An advantage of the embodiment of the invention is that the values of the variable elements of the pass-band correction circuit are not affected by the state of the carrier recovery circuit. As an advantageous consequence, such an circuit associated with a demodulator notably may utilize the carrier recovery circuit described in French patent application No. 83 03 688 filed by Applicants on Mar. 7, 1983. The carrier recovery circuit employs an AGC which equalizes even when there is no synchronization between the recovered carrier and the received carrier.

A further advantage of the invention is that the carrier recovery circuit benefits from the equalization.

According to a first feature of the invention, the correction filters are formed by variable elements operating at the carrier frequency.

This first feature affords the advantage that it is no longer necessary to provide an in-phase path and a quadrature path and equalizing circuits for each of these paths.

According to a second feature of the invention, the passband correction circuit is formed by a second demodulation circuit cooperating with an oscillator circuit of a predetermined frequency equal to the nominal value of the carrier frequency. Equalizing circuits act on the output signals of the second demodulation circuit, and a modulation circuit cooperates with the oscillator circuit of the predetermined frequency for producing the input signals for the first demodulation circuit.

This feature affords the advantage that the equalizing circuits operate at lower frequencies, which makes it simpler to realize this correction circuit when considering the necessity of having many variable elements while maintaining the independence of the variable parameters of the equalizers relative to the state of the carrier recovery circuit.

DESCRIPTION OF THE FIGURES

The above and other features of the invention will be more fully appreciated from the following description of exemplary embodiments when considered in conjunction with the accompanying drawings, in which.

DESCRIPTION OF THE PREFERRED EMBODIMENT

Figure 1:
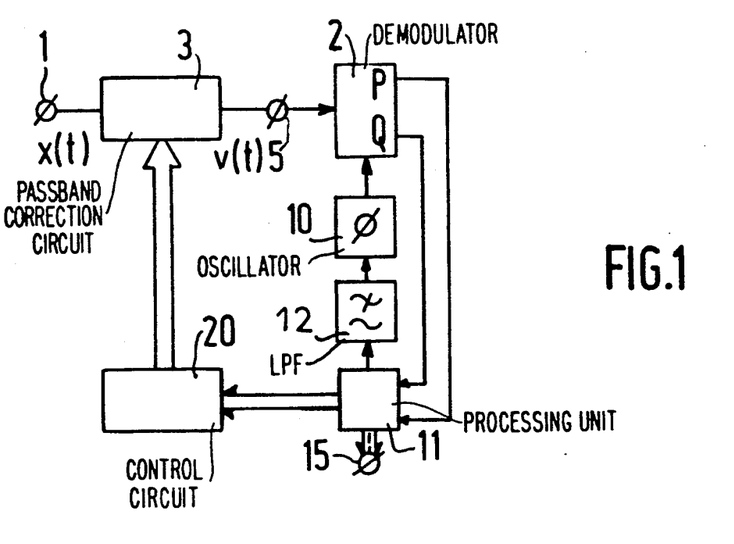
FIG. 1 shows a block diagram of an equalizer circuit according to the invention.

FIG. 1 shows an equalizing circuit according to the invention. Input signals which exhibit phase-modulation and amplitude-modulation of a carrier are received at a terminal 1. This signal is impaired by noise and distorted during transmission. In order to obtain an adequate demodulation with the aid of a demodulator 2, a passband correction circuit is provided whose input is connected to terminal 1 and whose output terminal 5 is connected to the input of demodulator 2. The output signals of this demodulator, available at its outputs P and Q, are the respective projections of the amplitude of the signal at terminal 5 onto the in-phase component P and the quadrature component Q of the output signal of an oscillator 10.

A processing unit 11 applies via a low-pass filter 12 a correction signal to oscillator 10, which for that purpose comprises a frequency control feature. This circuit 11 also supplies the baseband data at an output terminal 15 and also baseband signals for a control circuit 20 which acts on the variable elements comprised in passband correction circuit 3.

According to the invention, the passband correction circuit produces a passband output signal v(t), which is a continuous function of the time, in response to a passband input signal x(t), which is a continuous function of the time, in accordance with the expression:

$$v(t) = \sum_{m=1}^{M} r_m e^{i\psi_m} v(t - \tau_m) + \sum_{j=0}^{N} \rho_j e^{i\phi_j} x(t - \tau_j) \quad (1)$$

where $r_m$, $\psi_m$, $\rho_j$, $\phi_j$ are variable elements, and $\tau_j$, $\tau_m$ are fixed time delays and M, N are constants.

Figure 2A:
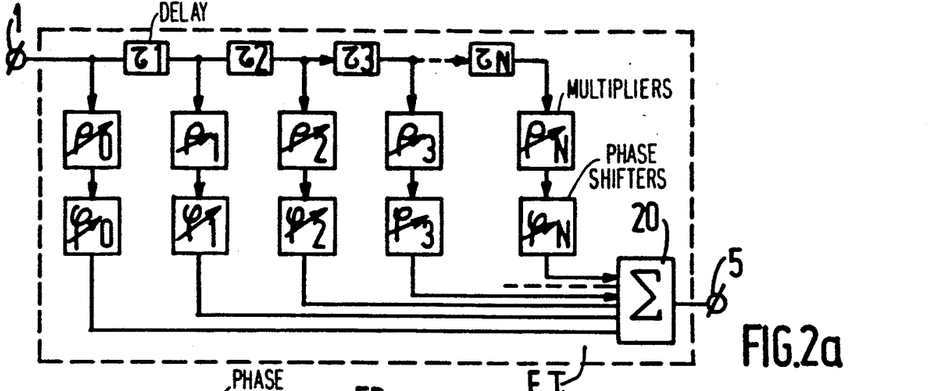
FIGS. 2a to 2g show embodiments of the correction circuit suitable for the equalizing circuits according to the invention.

FIG. 2a shows a correction circuit suitable for the equalizing circuit according to the invention. This is a transversal filter FT. In this case it must be assumed that $r_m = 0$ for all m in formula (1). This circuit is formed from a cascade arrangement of N delay elements which produces a delay $\tau_1$, $\tau_2$, $\tau_3$, ... $\tau_N$, respectively. A tapping point is provided between terminal 1 and the delay element producing a time delay $\tau_1$, and to this tapping point a multiplier element is connected which multiplies by a variable parameter $\rho_0$ and which is followed by a variable phase-shifter having a phase shift of $\phi_0$. Similarly, between the delay elements ($\tau_1$, $\tau_2$) ($\tau_2$, $\tau_3$) ($\tau_3$, ... ) ( ..., $\tau_N$) as well as the output of the element ($\tau_N$) are provided different tapping points, to which respective variable multiplier elements ($\rho_1$, $\rho_2$, $\rho_3$, ... $\rho_N$) are connected which are followed by variable phase shifters ($\phi_1$, $\Phi_2$, $\Phi_3$, ... $\Phi_N$). An adder 20 applies the sum of the signals coming from these different branches to terminal 5.

Figure 2B:
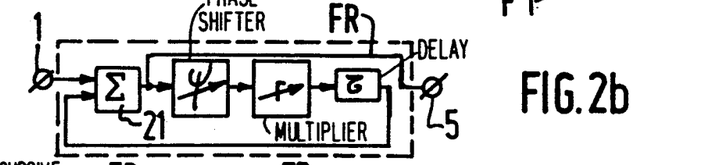

FIG. 2b shows a correction circuit with a recursive transfer function FR, that is to say that in formula (1) it is to be assumed that $\rho_j = 0$ for all j = 1 to N and $\tau_0 = 0$. So as to avoid all problems of checking the stability of recursive structures, cascade arrangements of structures having one signle delay element are used. This structure is formed by an adder 21 whose output is connected to one of its inputs via a variable phase shifter ($\psi$), a multiplier element multiplying by a variable parameter (r) and a delay element ($\tau$). The other input is connected to terminal 1 and the output is also connected to terminal 5.

Figure 2C:
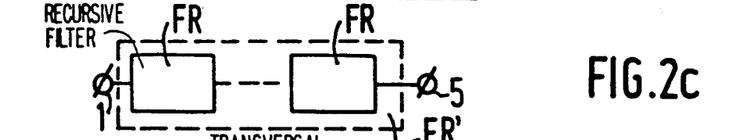

FIG. 2c shows a correction circuit which also has a recursive structure FR'. It is formed by the cascade arrangement of a plurality of structures FR, shown in FIG. 2b.

Figure 2D:
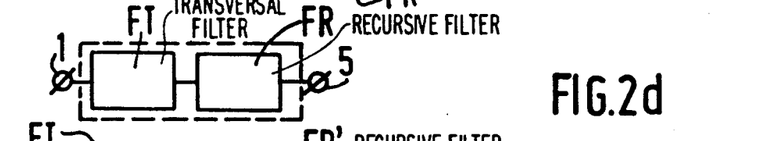
Figures 2E, 2G:
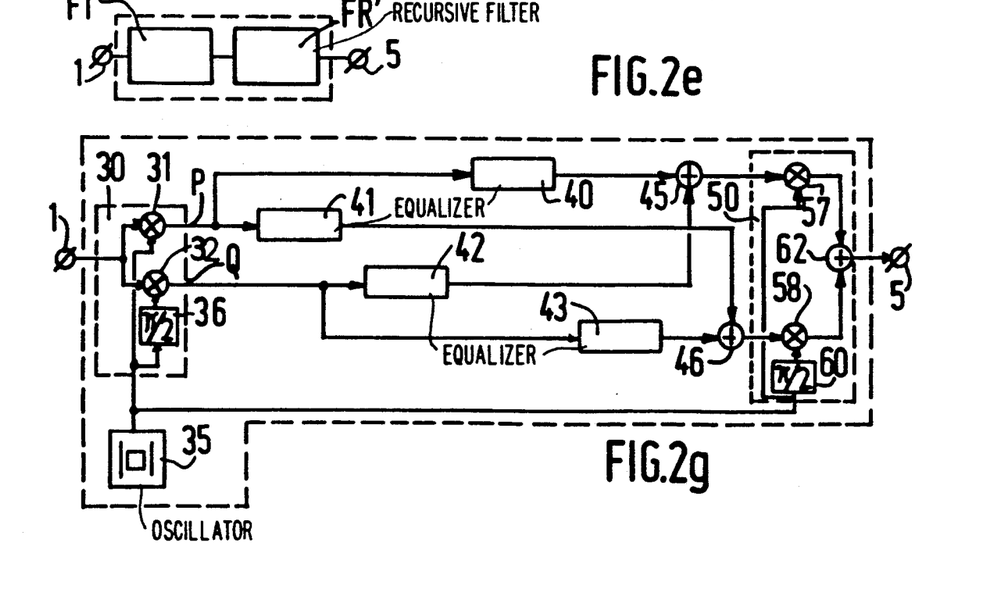

FIGS. 2d and 2e show a correction circuit formed by a transversal filter FR arranged in cascade with a recursive structure of the type FR (FIG. 2d) or with a recursive structure of the type FR' (FIG. 2e).

Figure 2F:
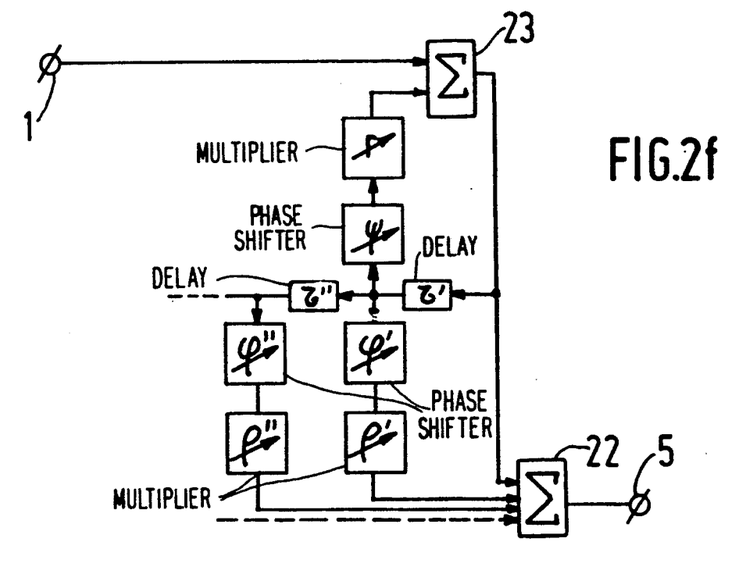

FIG. 2f shows a correction circuit having a canonical structure. This structure is built up around a cascade arrangement of delay elements ($\tau'$, $\tau''$, ....). This arrangement is used to form a transversal structure and simultaneously a recursive structure. The transversal structure comprises, in addition to this arrangement of delay elements, an adder 22 to form the sum of the signals issued from the several branches connected to different tapping points of the arrangement, these branches comprising variable phase shifting elements $\phi'$, $\phi''$, ... and variable multiplying elements $\rho'$, $\rho''$, ... . The recursive structure comprises, in addition to the arrangement of delay elements, an adder 23 having its output connected to an input of adder 22 and forming the sum of the signal at terminal 1 and the signals issued from a preferred branch in which a variable phase shifting element $\psi$ and a variable multiplying element r are inserted.

FIG. 2g shows a correction circuit which operates in the baseband, but which satisfies the expression (1). First of all, it comprises a quadrature demodulator 30 whose structure is shown in detail. This demodulator is composed in well known manner, of two elementary demodulators 31 and 32 one input of which is connected to terminal 1; the other input of demodulator 31 is connected to the output of a quartz oscillator 35 and the other input of demodulator 32 is connected to the output of a phase shifter 36 shifting the output signal of oscillator 35 over 90°. The output P of this demodulator 30 is formed by the output of demodulator 31 and the output Q by that of demodulator 32. Reference numerals 40, 41, 42, 43 indicate the variable-parameter equalizing circuits which may be of the transversal, recursive or mixed types shown in FIGS. 2a to 2f.

The inputs of circuits 40 and 41 are connected to the output P of demodulator 30 and the inputs of circuits 42 and 43 are connected to its output Q. The outputs of circuits 40 and 42 are connected to the inputs of a signal adder 45 and the outputs of circuits 41 and 43 are connected to the inputs of a further signal adder 46. The output signals of adders 45, 46 are remodulated on a carrier at the frequency of oscillator 35 by a quadrature modulator 50. This modulator 50 is composed of two elementary modulators 57 and 58. The two inputs of modulator 57 are connected to respectively the output of adder 45 and to the output of oscillator 35. The two inputs of modulator 58 are connected to respectively the output of adder 46 and to a phase shifter 60 shifting the output signal of oscillator 35 over 90°. The outputs of modulators 57 and 58 are connected to the inputs of an adder 62, whose output is connected to terminal 5. The frequency of oscillator 35 is equal to the nominal frequency of the carrier of the signals under consideration at terminal 1.

The different variable elements $\rho_j$, $\phi_j$, $r_m$ and $\psi_m$ are controlled by means of control circuit 20 by using, as will be set forth in greater detail hereinafter, an algorithm derived from the gradient algorithm to minimize the mean-square error of the baseband signals.

In response to the instantaneous error $\bar{e}$, the different elements are adjusted as follows:

$$\rho_{k+1} = \rho_k - A\left[e, \frac{\partial e}{\partial \rho}\right]$$

$$\phi_{k+1} = \phi_k - B\left[e, \frac{\partial e}{\partial \phi}\right]$$

$$r_{k+1} = r_k - C\left[e, \frac{\partial e}{\partial r}\right]$$

-continued $$\psi_{k+1} = \psi_k - D\left[e, \frac{\partial e}{\partial \psi}\right]$$

The index k indicates instants separated by a value T equal to the inverse of the data transmission rate and A, B, C, D are functions with, for example:

$$A(x,y) = \delta \, sgn(x \cdot y) = C(x,y)$$

$$B(x,y) = \epsilon \, sgn(x \cdot y) = D(x,y)$$

$\delta$ and $\epsilon$ being positive constants and the function sgn being such that sgn $x = 1$ if $x > 0$ sgn $x = -1$ if $x \leq 0$ or rather:

$$A(x,y) = C(x,y) = +3\delta \text{ if } 0 < |(x,y)| \leq \frac{\pi}{8}$$

$$= +\delta \text{ if } \frac{\pi}{8} < |(x,y)| \leq \frac{3\pi}{8}$$

$$= 0 \text{ if } \frac{3\pi}{8} < |(x,y)| \leq \frac{5\pi}{8}$$

$$= -\delta \text{ if } \frac{5\pi}{8} < |(x,y)| \leq \frac{7\pi}{8}$$

$$= -3\delta \text{ if } \frac{7\pi}{8} < |(x,y)| \leq \pi$$

$$B(x,y) = D(x,y) = 0 \text{ if } \frac{3\pi}{8} < |(x,y)| < \frac{5\pi}{8}$$

$$= +\epsilon \text{ if } 0 \leq |(x,y)| < \frac{3\pi}{8}$$

$$= -\epsilon \text{ if } \pi \geq |(x,y)| > \frac{5\pi}{8}$$

$\delta$ and $\epsilon$ being positive constants.

Before the preferred embodiment of an equalizing arrangement according to the invention will be described in greater detail, the principles of 16.QAM modulation will be recalled to mind, which is the modulation method used for the signals applied to the input terminal of this preferred embodiment according to the invention.

This 16 QAM modulation is a 16-state modulation. These 16 modulation states are given the references E1, E2, E3 ... E16 in FIG. 3; state E1 is characterized by signals of amplitude "1" related to the components P and Q, state E3 by signals of amplitude "3" related to the components P and Q, state E2 by signals of amplitude "3" and "1" related respectively to the components P and Q, and state E4 by signals of amplitude "1" and "3" related respectively to the components P and Q. The states E5, E6, E7 and E8 occupy symmetrical positions, relative to the component Q, to the states E1, E4, E3 and E2. As regards the states E9, E10, E11, E12, E13, E14, E15 and E16, they occupy symmetrical positions, relative to the component P, to the states E5, E8, E7, E6, E1, E4, E3 and E2, respectively.

Figure 4:
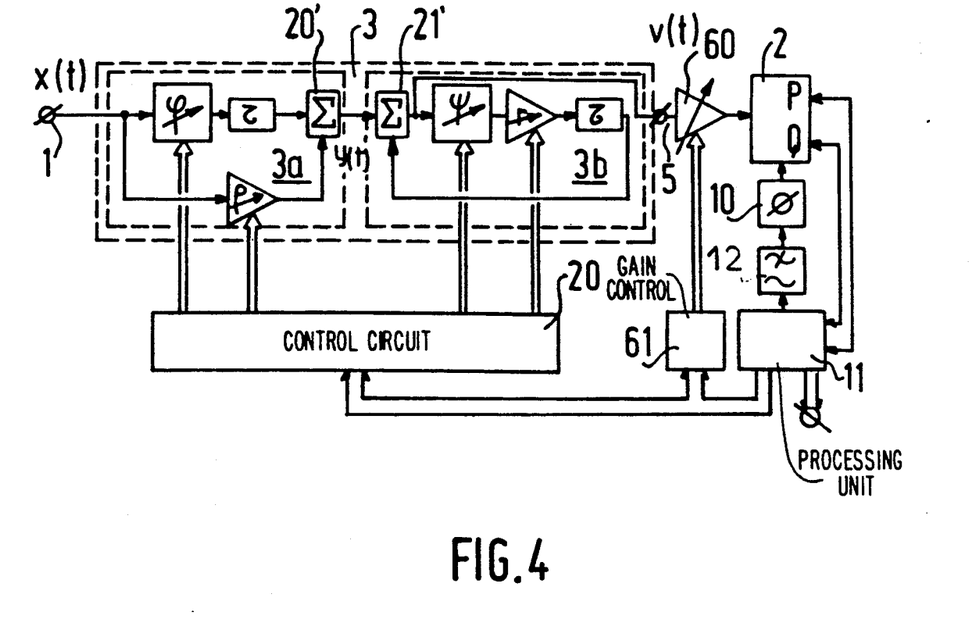
FIG. 4 shows a block diagram of a preferred embodiment of an equalizer circuit according to the invention.

FIG. 4 shows the preferred embodiment of an equalizing circuit according to the invention, in which elements corresponding to those of the preceding Figures are given the same reference numerals.

In one possible implementation, correction circuit 3 is formed by two portions 3a and 3b, the first portion having a transversal structure and the second a recursive structure. The portion 3a has a transversal structure and comprises a variable phase shifting element $\phi$ and a multiplier element multiplying by a variable parameter $\rho$. The input of these elements are connected to terminal 1. The output of phase shifting element $\phi$ is connected to the input of an adder 20' via a delay element producing a time delay $\tau$. The output of the multiplier element $\rho$ is connected to the other input of adder 20'. The portion 3b has a recursive structure and comprises an adder 21', one input of which is connected to the output of adder 20' and the output of which is connected to terminal 5. The output of adder 21' is connected to its other input via a phase shifting element $\psi$, a multiplier element r and a further delay element also producing a time delay $\tau$. The two portions 3a and 3b have the respective transfer functions G($\nu$) and H($\nu$):

$$G(\nu) = \rho + e^{j(\phi - 2\pi\nu\tau)}$$

$$H(\nu) = \frac{1}{1 - re^{j(\psi - 2\pi\nu\tau)}}$$

The time delay $\tau$ is chosen such that the transfer functions of these filters can only show a single pole or a single zero, respectively, in a frequency band $$1/\tau > 1/T$$

where 1/T is equal to the modulation rate.

Furthermore, in order to obtain a simple linear estimation of the signal at terminal 1 at the instants that are multiples of the delay $\tau$, one half of the symbol interval T has been taken for that delay and thus $\tau = T/2$.

An AGC (automatic gain control) amplifier 60, whose gain is determined by an automatic gain control element 61 controlled in accordance with the statistics of the transmitted signal, is connected between terminal 5 and the input of demodulator 2.

Figure 5:
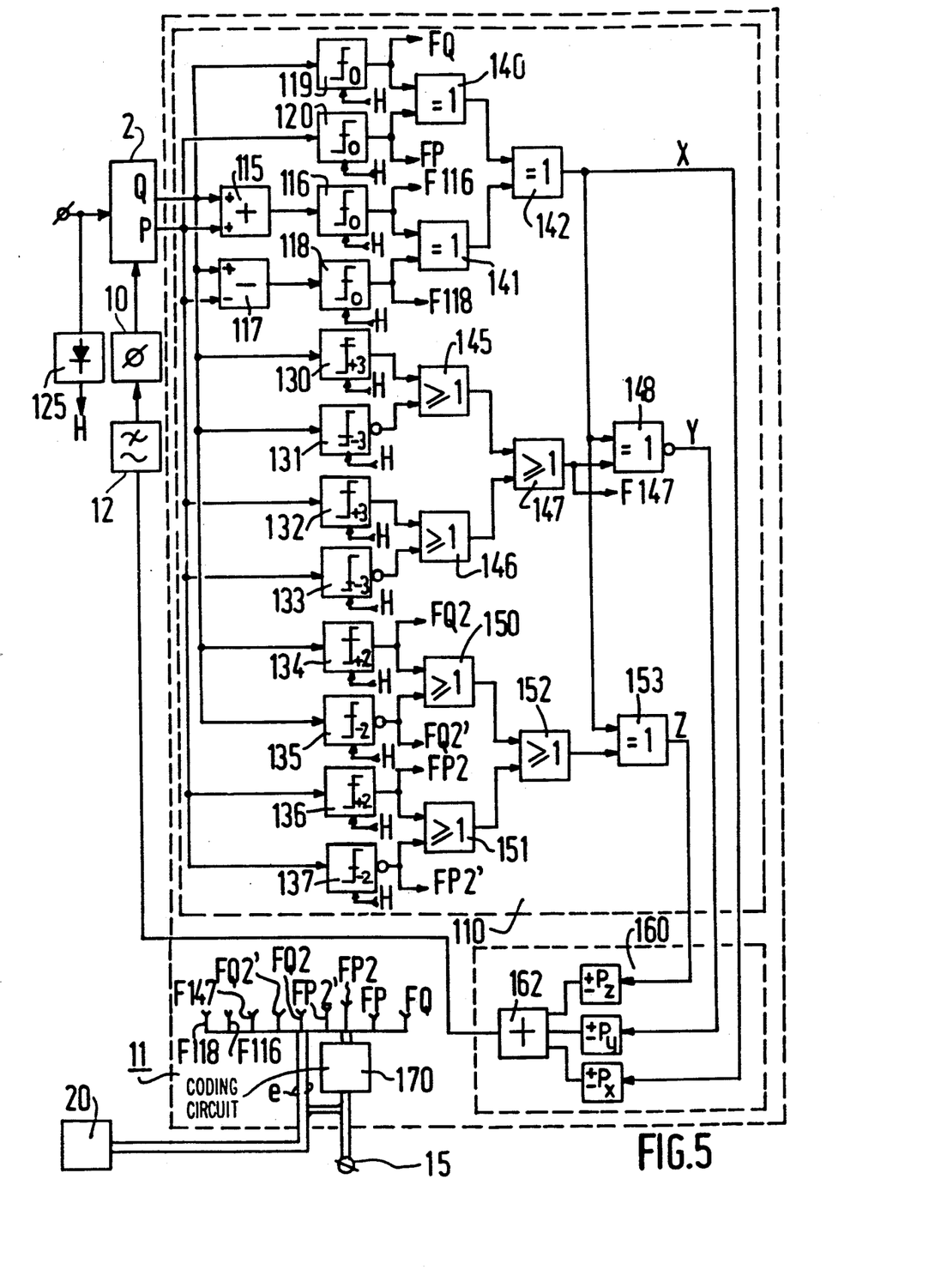
FIG. 5 shows a possible embodiment of a processing circuit suitable for the equalizer circuit of FIG. 4.

FIG. 5 shows processing circuit 11 in detail. This circuit is described in French patent application No. 83 03 688 filed by Applicants on Mar. 7, 1983 and corresponding U.S. Pat. No. 4,587,498. This circuit comprises a zone-determining circuit 110 which includes an adder 115, whose inputs are connected to outputs P and Q of quadrature demodulator 2 and whose output is connected to a decision circuit 116, a subtractor 117 whose (+) input is connected to output Q, whose (−) input is connected to output P and whose output is connected to a decision circuit 118. Circuit 110 also includes a decision circuit 119 whose input is connected to output Q and a decision circuit 120 whose input is connected to output P. The circuits 116, 118, 119 and 120 supply a signal of logic value "1" when the signal at their input is greater than "0" and, if not the logic value "0". The logic values at the output appear at the rate at which the different states of the state signal appear. For this purpose, as is known, a clock generator 125 is provided which supplies signals H representing this rate of appearance and these signals H are applied to the different decision circuits 116, 118, 119 and 120. Further decision circuits are provided:

circuit 130, whose input is connected to output Q supplies a logic signal "1" for an input signal greater than "+3", and "0" otherwise;

circuit 131, whose input is connected to output Q supplies a logic signal "1" for an input signal less than "−3", and "0" otherwise;

circuit 132, whose input is connected to output P supplies a logic signal "1" for an input signal greater than "+3", and "0" otherwise;

circuit 133, whose input is connected to output P supplies a logic signal "1" for an input signal less than "−3", and "0" otherwise;

circuit 134, whose input is connected to output Q supplies a logic signal "1" for an input signal greater than "+2", and "0" otherwise;

circuit 135, whose input is connected to output Q supplies a logic signal "1" for an input signal less than "−2", and "0" otherwise;

circuit 136, whose input is connected to output P supplies a logic signal "1" for an input signal greater than "+2", and "0" otherwise;

circuit 137, whose input is connected to output P supplies a logic signal "1" for an input signal less than "−2", and "0" otherwise.

Different logic circuits determine different zones on the basis of logic signals supplied by these decision circuits.

The EXCLUSIVE-OR gates 140, 141 and 142 determine zones X. Gate 142 has two inputs one of which is connected to the output of gate 140 and the other to the output of gate 141. The two inputs of gate 140 are connected to the output of decision circuits 119 and 120 and the two inputs of gate 141 are connected to the output of decision circuits 116 and 118. These zones X are delimited on the one hand by the axes P and Q and on the other hand by the coordinates of the equations $p+q=0$ and $p-q=0$, where p is the abscissa value and q the ordinate value.

The OR-gates 145, 146 and 147 and EXCLUSIVE-OR gate 148 with inverted output cooperating with gate 142 determine zones Y. Gate 148 has a first input connected to the output of gate 142 and a second input connected to the output of gate 147. Gate 147 has a first input connected to the output of gate 145 and a second input connected to the output of gate 146. The two inputs of gate 145 are connected to the output of decision circuits 130 and 131 and the two inputs of gate 146 to the outputs of decision circuits 132 and 133. In the P, Q plane these zones Y are delimited on the one hand by the axes P, Q and the lines $p+q=0$ and $p-q=0$ and on the other hand by a square defined by the lines $p=3$, $p=-3$, $q=3$ and $q=-3$.

The OR-gates 150, 151 and 152 and EXCLUSIVE-OR gate 153 cooperating with gate 142 determine zones Z. Gate 153 has a first input connected to the output of gate 142 and a second input connected to the output of gate 152. Gate 152 has a first input connected to the output of gate 150 and a second input connected to the output of gate 151. The two inputs of gate 150 are connected to the outputs of decision circuits 134 and 135 and those of gate 151 to the outputs of decision circuits 136 and 137. In the P, Q plane these zones Z are delimited on the one hand by the axes P, Q and the lines $p+q=0$, $p-q=0$ and on the other hand by a square defined by the lines $p=2$, $p=-2$, $q=2$ and $q=-2$.

On the basis of the output signals of gates 142, 148 and 153 a weighting circuit 160 applies a signal to integrating lowpass filter 12 in the following manner:
to the logic values "1" of the output signals of gates 142, 148 and 153 the respective positive values $+Px$, $+Py$, $+Pz$ are allocated and to the values "0" the negative values $-Px$, $-Py$, $-Pz$.

these allocated values are thereafter added together by an adder 162.

If the values of Px, Py, Pz are such that $Px=3.5$, $Py=2$ and $Pz=0.5$, then the weighting zones ZP1, ZP2, ZP3, ZP4, ZP5 and ZP6 are defined.

To the zone ZP1 delimited by the axis P, the line $p-q=0$ the line $p=2$, the value "−2" is allocated.

To the zone ZP2 delimited by the axis P, the line $p-q=0$ and the line $p=2$ and the line $p=3$, the value "−1" is allocated.

To the zone ZP3 delimited by the axis P, the line $p-q=0$ and the line $p=3$, the value "−5" is allocated.

To the zones ZP4, ZP5 and ZP6 which are symmetrical, relative to the line $p-q=0$, to the zones ZP1, ZP2 and ZP3 the values "+2", "+1" and "+5" are allocated, respectively.

For the other quadrants, the distribution of the zones is determined by successive rotations of the first quadrant around the point of intersection of the coordinates P and Q.

It is interesting to note that the decision circuits can be used for supplying logic signals corresponding to the different states E1 to E16. If FQ, FP, FQ2, FQ2', FP2 and FP2' designate the signals at the output of the decision circuits 119, 120, 134, 135, 136 and 137, respectively a coding circuit 170 supplies signals representing the states E1 to E16. The coding circuit 170 effects the following logic operations.

$E3 = FQ2 \cdot FP2$
$E7 = FQ2 \cdot FP2'$
$E11 = FQ2' \cdot FP2'$
$E15 = FQ2' \cdot FP2$
$E4 = FQ2 \cdot FP \cdot E3$
$E2 = FP2 \cdot FQ \cdot E3$
$E1 = FP \cdot FQ \cdot E3 \cdot E2 \cdot E4$
$E8 = FP2' \cdot FQ \cdot E7$
$E6 = FP \cdot FQ2 \cdot E7$
$E5 = FP \cdot FQ \cdot E7 \cdot E6 \cdot E8$
$E12 = FP \cdot FQ2' \cdot E11$
$E10 = FP2' \cdot FQ \cdot E11$
$E9 = FP \cdot FQ \cdot E11 \cdot E10 \cdot E12$
$E16 = FP2 \cdot FQ \cdot E15$
$E14 = FQ2' \cdot FQ \cdot E15$
$E13 = FP \cdot FQ \cdot E15 \cdot E14 \cdot E16$ It is evident that on the basis of the decision circuits and the logic circuits the states may be determined directly by dibits. For example, the first dibit of a state gives the number of the quadrant which is obtained by the comparators 119 and 120 and the second dibit gives the place of the dibit in the quadrant which is obtained by the comparators 134 to 137 and the gates 150 and 151.

Figure 6:
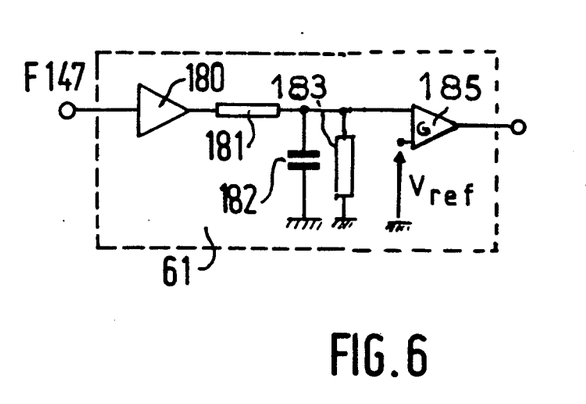
FIG. 6 shows a circuit diagram of the control element for an AGC amplifier in FIG. 4.

In FIG. 6, the construction of gain control element 61 is shown schematically. It is formed by an amplifier 180 whose input is connected to wire F147 connected to the output of OR-gate 147; the output of this amplifier is connected to one end of a resistor 181 whose other end is connected to ground via a parallel arrangement of a capacitor 182 and a further resistor 183. This arrangement is connected to one input of a variable gain amplifier G185 whose other input receives a reference voltage. The gain of gain control amplifier 60 is fixed by the output voltage of this amplifier 185.

The active signals on wire F147 designate the regenerated data which have at least one of their coordinates higher than the maximum values (states E3, E7, ...). By means of these active signals, element 61 maintains the proportion of regenerated states having this property at a target value, which is a function of the statistics of the transmitted signals.

Figure 7:
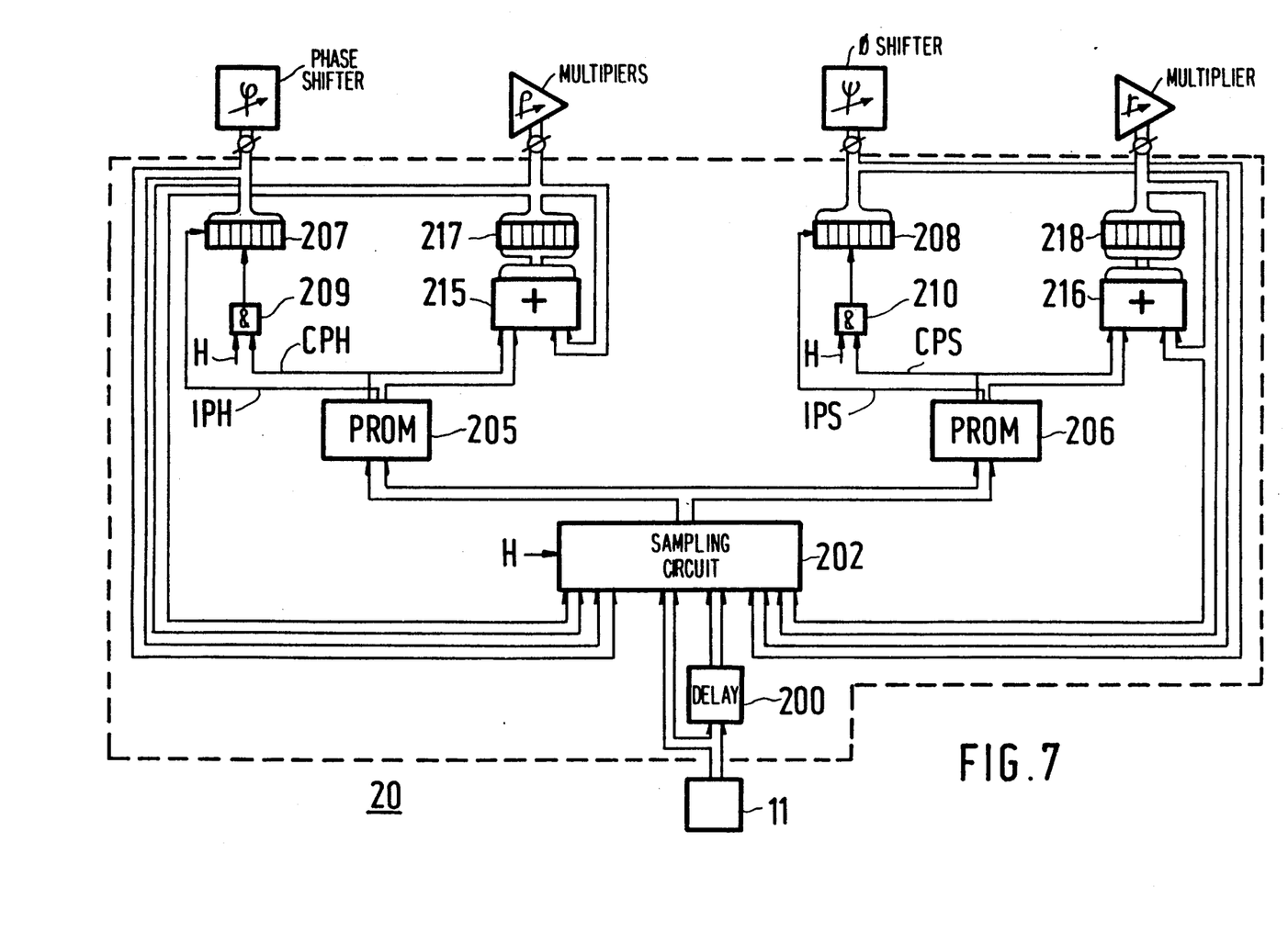
FIG. 7 shows an embodiment of the control circuit which forms part of the circuit shown in FIG. 4.

FIG. 7 shows in detail the structure of control circuit 20. The inputs of circuit 20 are constituted by the regenerated data and by the error signal between the signal received and the nominal value of this signal corresponding to these regenerated data. It is formed by a delay circuit assembly 200 having a delay which is a multiple of T, the input of which is connected to the input of a sampling circuit 202 controlled by the signals H of rate generator 125, the outputs of this sampling circuit serving to transmit an address code for two read-only memories 205 and 206. Control words correspond to these address codes. The control words supplied by memory 205 are used to control the parameters $\phi$ and $\rho$ of the portion 3a and those supplied by memory 206 for the parameters $\psi$ and r of the portion 3b. These control words are not used as they are. Thus, the value $\phi$ is wholly determined by the contents of an up/down counter 207. Similarly, the value $\psi$ is determined by a further up/down counter 208. Two bits of the control words supplied by memories 205 and 206 are sufficient to control counters 207 and 208. A bit transmitted over a wire CPH connected to the output of memory 205 authorizes or does not authorize, according to its value, the passing of a clock signal H for incrementing up/down counter 207 through an AND-gate 209. In the same way, a bit transmitted over a wire CPS which connects an AND-gate 210 to an output of memory 206 authorizes or does not authorize, according to its value, changing of the content of up/down counter 208. A bit transmitted over a wire IPH and supplied by memory 205 adjusts, as a function of its value, up/down counter 207 to the up-counting or the down-counting position. A bit transmitted over a wire IPS and supplied by memory 206 adjusts, as a function of its value, up/down counter 208 to the up-counting or the down-counting position. To control the parameters $\rho$ and r, adders 215, 216 and buffer memories 217 and 218 are used. The values $\rho$ and r are determined by the content of buffers 217 and 218 respectively. These memories provide the value of the sum of the preceding value and a positive or a negative increment processed by memories 205 and 206. The values of the parameters $\phi$, $\rho$, $\psi$, r are fed back, at least for the most significant bits, to the inputs of memories 205 and 206 through the sampler 202.

The memories 205 and 206 are programmed to realize the estimate of the functions.

$$A\left(e, \frac{\partial e}{\partial \rho}\right),$$

$$B\left(e, \frac{\partial e}{\partial \phi}\right),$$

$$C\left(e, \frac{\partial e}{\partial r}\right),$$

$$D\left(e, \frac{\partial e}{\partial \psi}\right)$$

as a function of the current values of the parameters $\rho$, $\phi$, $\psi$, r of the data and the error signal, as well as the values of the data at the instants $(t \pm nT)$.

Let us first examine the case of memory 206.

If the respective input signals and output signals of the portion 3b are denoted by y(t) and v(t) then:

$$v(t) = y(t) + kv(t - \tau) \text{ where } k = re^{i\psi} \quad (10)$$

$$\frac{\partial v(t)}{\partial r} = e^{i\psi} v(t - \tau) + k \frac{\partial}{\partial r} v(t - \tau) + \frac{\partial \tau}{\partial r} \frac{\partial v}{\partial t}$$

$$\frac{\partial v(t)}{\partial t} = \left[\frac{\partial y(t)}{\partial t} + k \frac{\partial v(t - \tau)}{\partial t}\right]$$

the term $\partial v/\partial t$ is due to the variation in the sampling operation caused by a modification of r.

In fact, clock recovery circuit 125 operates such that the energy is at its maximum at the sampling instant; this energy is proportional to:

$$v^2(t) = y^2(t) + k^2 v^2(t-\tau) + 2ky(t)v(t-\tau)$$

and at the sampling instant it is thus obtained that:

$$\frac{\partial}{\partial t} v^2(t) = 0$$

that is to say:

$$\frac{\partial y(t)}{\partial t} + k \frac{\partial v(t - \tau)}{\partial t} = \frac{\partial v(t)}{\partial t} = 0$$

On the other hand, one tries to evaluate the gradient of the error e:

$$e = v(t) - v(t)$$

where v(t) is the estimated value, and the gradient is:

$$\frac{\partial e}{\partial r} = \frac{\partial v(t)}{\partial r} - \frac{\partial v(t)}{\partial r}$$

The value v(t) is such that $$v(t) = E_t[v(t)]$$

where $E_t$ indicates the mean value at the instant t of the quantity between brackets. As a result:

$$\frac{\partial e}{\partial r} = e^{i\psi} v(t - \tau) + k \frac{\partial}{\partial r} v(t - \tau) - e^{i\psi} E_t[v(t - \tau)] -$$

$$kE_t\left[\frac{\partial}{\partial r} v(t - \tau)\right]$$

Figure 3:
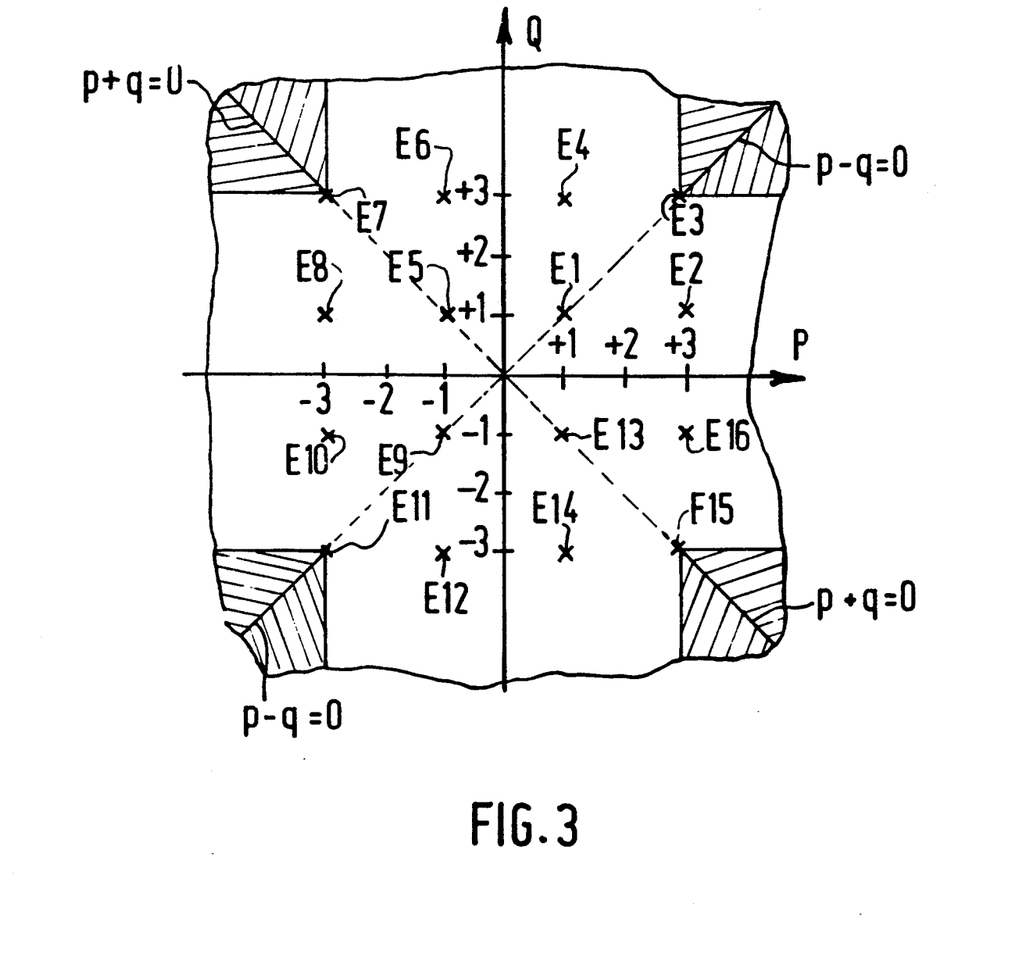
FIG. 3 illustrates the constellation of modulation states for an input signal modulated in accordance with the 16 QAM modulation method.

To simplify the realization, the gradient of the error is only evaluated for two peak states nT apart, and for this particular parameter for two successive peak states (n=1), that is to say the states E3, E7, E11 and E15 (FIG. 3).

Evaluating this gradient is done by:

$$E_{t,t-T}\left[\frac{\partial e}{\partial r}\right]$$

that is to say the average value taken thereby, the values v being fixed at the instants t and t−T $$E_{t,t-T}\left[\frac{\partial e}{\partial r}\right] = e^{i\psi}E_{t,t-T}\{v(t-\tau) - E_t[v(t-\tau)]\} +$$

$$kE_{t,t-T}\left\{\frac{\partial v(t-\tau)}{\partial r} - E_t\left[\frac{\partial v(t-\tau)}{\partial r}\right]\right\}$$

Near equalization, one can write, assuming $\tau = T/2$:

$$E_{t,t-T}[v(t-T/2)] = [v(t) + v(t-T)] \cdot h_{(t-T/2)}$$

$h_{(t-T/2)}$ is the value taken by the impulse response of the filter which represents the overall transfer function of the channel in the absence of distortions. This value will be represented in a simpler way by $h_{\frac{1}{2}}$. Moreover:

$$E_t[v(t-T/2)] = v(t) \cdot h_{\frac{1}{2}}$$

Evaluating $$\frac{\partial}{\partial r} v(t - T/2)$$

is effected by means of the recursion formula:

$$\frac{\partial}{\partial r} v(t - T/2) = e^{i\psi}v(t-T) + k\frac{\partial v(t-T)}{\partial r}$$

Hence:

$$E_{t,t-T}\left[\frac{\partial}{\partial r} v(t-T/2)\right] = e^{i\psi}v(t-T) +$$

$$re^{2i\psi}[h_{1/2}v(t-T) + h_{3/2}v(t)] +$$

$$r^3e^{4i\psi}[h_{3/2}v(t-T) + h_{5/2}v(t)] + \ldots$$

and:

$$E_t\left[\frac{\partial}{\partial r} v(t - T/2)\right] = re^{2i\psi}[h_{3/2}v(t)] + r^3e^{4i\psi}[h_{5/2}v(t)] + \ldots$$

hence, when only the first terms are considered:

$$E_{t,t-T}\left[\frac{\partial e}{\partial r}\right] = e^{i\psi}v(t-T)[h_{1/2}(1 + r^2e^{2i\psi}) + re^{i\psi}]$$

In the same way as the value of the gradient of the error with respect to r was estimated, the gradient of the error with respect to $\psi$ is estimated:

$$E_{t,t-T}\left[\frac{\partial e}{\partial \psi}\right] = E_{t,t-T}\left\{ire^{i\psi}v(t-T/2) + re^{i\psi}v(t-T/2) - \right.$$

$$\left. ire^{i\psi}E_t[v(t-T/2)] - re^{i\psi}E_t\left[\frac{\partial}{\partial \psi}v(t-T/2)\right]\right\}$$

and finally $$E_{t,t-T}\left[\frac{\partial e}{\partial \psi}\right] = irE_{t,t-T}\left[\frac{\partial e}{\partial r}\right]$$

The quantities forming the address code of memory 206 will be:

3 bits which determine the error, which error is only considered when the point representing the received signal is positioned in the hatched zones of FIG. 3, that is to say if this point is such that $|p|$ and $|q|$ are greater than 3, the error will have a "+" or "−" sign depending on which side of the lines of equation $p+q=0$ and $p-q=0$ the said point is situated. The error signal will be processed by the signals transmitted over wires F116 and F118, which are connected to the outputs of decision circuits 116 and 118 and will be validated by the signal transmitted over wire F147, which is connected to the output of gate 147.

the bits representing the regenerated states at the instants t and t−T.

the most significant bits to determine the values $\psi$ and r.

Let us now examine the case of memory 205.

If the respective input signals and the output signals of the portions 3a are denoted by x(t) and y(t), then:

$$y(t) = \rho x(t) + e^{i\phi}x(t-\tau)$$

As the filtering operations performed by the portions 3a and 3b are of the linear type, they are interchangeable and therefore a ficticious variable z(t) may be introduced which could be such that:

$$v(t) = \rho z(t) + e^{i\phi}z(t-\tau)$$

It is then written that:

$$\frac{\partial v(t)}{\partial \rho} = z(t)$$

hence:

$$\frac{\partial e}{\partial \rho} = z(t) - E_t[z(t)]$$

By recursion, it can be demonstrated that:

$$z(t) = e^{-i\phi}v(t+T/2) - \rho e^{-2i\phi}v(t+T) + \rho^2 e^{-3i\phi}v(t+3T/2) - \rho^3 e^{-4i\phi} \ldots$$

Finally, limiting the series expansion to the terms in $\rho^2$, it is obtained that:

$$E_{t,t+T}\left[\frac{\partial e}{\partial \rho}\right] = e^{-i\phi}[h_{1/2}(1 + \rho^2 e^{-2i\phi}) - \rho e^{i\phi}]v(t+T)$$

It is also possible to demonstrate that:

$$E_{t,t+T}\left[\frac{\partial e}{\partial \phi}\right] = -i\rho E_{t,t+T}\left[\frac{\partial e}{\partial \rho}\right]$$

In a manner similar to addressing memory 206, addressing memory 205 will be effected on the basis of bits representing the error, bits representing the regenerated states at the instants t and t+T, as well as most significant bits of the quantities $\rho$ and $\phi$.

Although an embodiment has been described in which the passband correction circuit comprises one single delay element, it will be evident that the invention can also be applied in the case in which this circuit comprises n delay elements. The data to be considered for adapting the parameter of the order n will then be spaced nT apart.

What is claimed is:

1. A passband signal controlled passband equalizing apparatus for correcting passband data signals x(t) comprising:

a passband correction circuit connected to receive at its input said signals x(t) and to provide at its output corrected passband signals v(t) comprising:

means, including a plurality of fixed delay elements respectively coupled to the input and output of said passband correction circuit for delaying by time intervals $t_j$ and $t_m$, the signals x(t) and v(t), respectively, thereby forming delayed replicas $x(t-t_j)$ and $v(t-t_m)$, respectively; a plurality of variable parameter circuit elements including multipliers for multiplying said delayed replicas $v(t-t_m)$ and $x(t-t_j)$, respectively, by factors of $r_m$ and $P_j$, respectively, and phase shifters for making $e^{i\psi m}$ and $e^{i\phi j}$ phase shift operations by applying phase shift factors of $\psi m$ and $\phi j$ to the delayed replicas $v(t-t_m)$ and $x(t-t_j)$, respectively; and addition means coupled to said delay elements for respectively adding the delayed replicas $x(t-t_j)$ and $v(t-t_m)$ after being processed in said plurality of variable parameter circuit elements, for providing a continuous transfer function in time defined by:

$$\sum_{m=1}^{M} r_m \cdot e^{i\psi m} \cdot v(t - t_m) + \sum_{j=0}^{N} P_j \cdot e^{i\phi j} \cdot x(t - t_j)$$

where M and N are the number of multipliers and phase shifters;

a carrier recovery circuit;

a first demodulation circuit cooperating with said carrier recovery circuit for converting said passband modulated signals from said passband correction circuit into baseband data signals; and a control circuit connected to said first demodulation circuit and said passband correction circuit for estimating an error of said passband signals, said control circuit altering said multiplying and phase shift factors ($r_m$, $P_j$, $\psi_m$, $\phi_j$) of the circuit elements in a direction to reduce said error.

2. An equalizing apparatus as claimed in claim 1, wherein the control circuit includes means which implements an algorithm derived from a stochastic gradient algorithm including a read-only memory whose address codes comprise a first code representing the selected value of the variable elements, second and third codes derived from outputs of the first demodulation circuit, the second code representing the regenerated data and the third code representing the value of the error, and by a fourth code supplied by a delay circuit having a time delay of nT where 1/T is the data transmission rate and n is an integer whose inputs receive the third and fourth codes, a sampling circuit being provided to apply the codes to the read-only memory circuit at the rate of the transmitted data, the output codes of the read-only memory circuit being used to fix the value of the variable elements in accordance with said derived algorithm.

3. An equalizing apparatus as claimed in claim 1 for data signals modulated in accordance with the QAM modulation method, the control circuit comprising selection means which only derives an error signal from the peak amplitude of said baseband signals, spaced apart by instants nT, where n is an integer, and T is the period of said data transmission rate 1/T, whose amplitudes are a maximum.

4. A baseband signal controlled passband equalizing apparatus, for correcting data signals x(t) modulated on a carrier signal so that each data are assigned to an amplitude and phase of the carrier and some data have a maximum value of amplitude, comprising:

a passband correction circuit connected to receive said data signals x(t) modulated on a carrier signal and arranged for providing corrected data signals v(t) modulated on said carrier signal, said passband correction circuit being formed by at least one delay element for providing at least one delayed by $t_m$ replica $v(t-t_m)$ of v(t), by a variable multiplier for multiplying by variable $r_m$ said replica $v(t-t_m)$, by a variable phase shifter element for phase shifting by variable $\psi_m$ the product of $\psi_m$ and said replica $v(t-t_m)$, by a plurality of "N" delay elements for providing delayed by $t_j$ replica $x(t-t_j)$ of x(t), by a plurality of "N" variable multipliers for multiplying by variable $p_j$ said replica $x(t-t_j)$, by a plurality of "N" variable phase shifter elements for phase shifting by variables $\phi_j$ the respective products of $p_j$ and said replica $x(t-t_j)$ and by adder means processing the following formula for providing the signal v(t):

$$v(t) = r_m e^{i\psi m} \cdot v(t - t_m) + \sum_{j=0}^{N} p_j e^{i\phi j} \cdot x(t - t_j)$$

where symbols $e^{i\psi m}$ and $e^{i\phi j}$ indicate the phase shifting processed by said variable phase shifter elements;

a gain controlled amplifier for amplifying a passband corrected signal from said passband correction circuit;

a demodulation circuit and carrier recovery circuit connected to receive a signal from said controlled amplifier, and generate said baseband data signal x(t);

correction circuit control means connected to receive a demodulated baseband signal from said demodulation circuit to provide control signals to said variable multiplier and phase shifter elements representing an estimated error of said data signals, said correction signals controlling said variable multiplier and phase shifter elements in a direction to minimize said estimator error;

gain control means connected to said demodulator for deriving a control voltage for said gain controlled amplifier such that said gain controlled amplifier maintains the amplitude of a demodulated baseband signal which is higher than a desired maximum value at a target value.

5. A baseband signal controlled passband equalizing apparatus according to claim 4, wherein said plurality of "N" delay elements comprises said at least one delay element which provides the at least one delayed by $t_m$ replica $v(t-t_m)$ of v(t).

6. A baseband signal controlled passband equalizing apparatus for correcting data signals x(t) modulated on a carrier signal comprising:

an oscillator generating a signal at said carrier signal frequency;

a demodulation circuit for producing a demodulated signals x(t) from said carrier signal and oscillator signal;

a passband correction circuit connected to receive said demodulated signals x(t) and to provide corrected signal v(t) modulated on said carrier signal, said passband correction circuit being formed by equalizing circuits provided with variable parameter circuits for processing the demodulated signals x(t) and for providing the signals v(t) to be modulated, and a correction modulation circuit cooperating with said oscillator of the carrier frequency for modulating the signals v(t) on the carrier signals;

a carrier recovery circuit;

a detection demodulation circuit cooperating with said carrier recovery circuit for converting modulated signals from said passband correction circuit into baseband data signals;

a control circuit connected to receive a signal from said passband correction circuit for estimating an error of said baseband signals from a transmitted signal, said control circuit altering said variable parameter circuits in a direction to reduce said error.

7. A baseband signal controlled passband equalizing apparatus, for correcting data signals x(t) having a data transmission rate of 1/T modulated on a carrier signal so that each data are assigned to an amplitude and phase of the carrier and some data have a maximum value of amplitude, comprising:

a passband correction circuit connected to receive said data signals x(t) modulated on a carrier signal and arranged for providing corrected data signals v(t) modulated on said carrier signal, said passband correction circuit including a first delay element for providing a delayed by T/2 replica v(t−T/2) of v(t), a first variable multiplier, for multiplying by a variable "r" said replica v(t−T/2), a first phase shifter element for phase shifting by a variable $\psi$, the product of "r" and said replica v(t−T/2), a second delay element for providing a delayed by T/2 replica x(t−T/2) of x(t), a second variable multiplier for multiplying by a variable p said replica x(t−T/2), a second phase shifter element for phase shifting by a variable $\phi$ the product of p and said replica x(t−T/2) and adder means for providing the signal v(t):

$$v(t) = re^{i\psi} \cdot v(t-T/2) + pe^{i\phi} \cdot x(t-T/2) + x(t)$$

where symbols $e^{i\psi}$ and $e^{i\phi}$ represent the phase shift processed by said variable phase shifter elements;

a gain controlled amplifier for amplifying a passband corrected signal from said passband correction circuit;

a demodulation circuit and carrier recovery circuit connected to receive a gain controlled passband signal from said controlled amplifier, and generate baseband data signal x(t);

correction circuit control means connected to receive a demodulated baseband signal from said demodulation circuit to provide control signals to said variable multiplier elements and phase shifter elements representing an estimated error of said data signals x(t), said correction signals controlling said variable multiplier elements and phase shifter elements in a direction to minimize said estimated error;

gain control means connected to a demodulator for deriving a control voltage for said gain controlled amplifier such that said gain controlled amplifier maintains the regenerated demodulated baseband signal maximum value at a target value.

* * * * *